Figure 1:
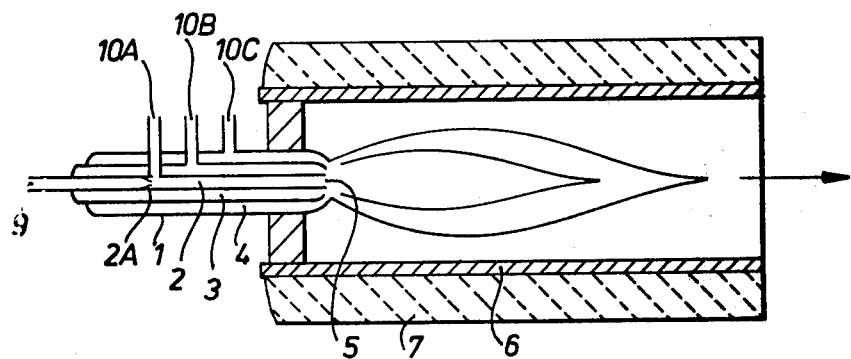
Figure 1A:
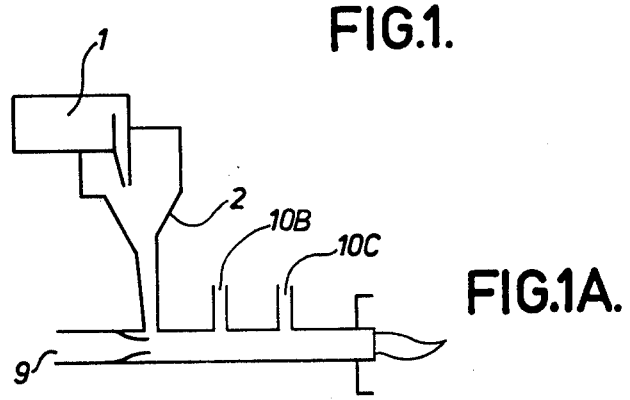

United States Patent [19]

Oliver et al.

[11] 4,145,187

[45] Mar. 20, 1979

[54] TREATMENT OF MATERIAL WITH HYDROGEN CHLORIDE

[75] Inventors: Raymond E. Oliver, Johannesburg, South Africa; George McGuire, London, England

[73] Assignee: Matthey Rustenburg Refiners (Pty.) Ltd., Johannesburg, South Africa

[21] Appl. No.: 746,748

[22] Filed: Dec. 2, 1976

Related U.S. Application Data

[63] Continuation-in-part of Ser. No. 559,423, Mar. 18, 1975, Pat. No. 3,998,926.

[30] Foreign Application Priority Data

Mar. 21, 1974 [GB] United Kingdom ............... 12598/74

[51] Int. Cl.² ..................... B01D 47/06; B01J 8/08; C01G 55/00; F27B 15/08
[52] U.S. Cl. ..................................... 422/232; 422/165; 75/1 R; 75/113; 110/261; 261/98; 261/118; 266/147; 266/171; 423/22; 423/44; 431/353
[58] Field of Search ............... 23/262, 277 R, 284; 423/22; 75/1 R, 113, 112; 261/DIG. 54; 266/146, 147, 171; 110/22 A, 261

[56] References Cited

U.S. PATENT DOCUMENTS

| | | | |
|---|---|---|---|
| 2,885,199 | 5/1959 | Patterson | 110/22 A X |
| 3,244,509 | 4/1966 | Nowak et al. | 75/112 X |
| 3,361,525 | 1/1968 | De Rycke et al. | 23/277 R UX |
| 3,445,192 | 5/1969 | Woodland et al. | 23/277 R |
| 3,450,503 | 6/1969 | Knorr | 23/277 R |
| 3,549,351 | 12/1970 | Lundquist | 75/113 X |
| 3,706,538 | 12/1972 | Chew | 261/DIG. 54 X |
| 3,723,068 | 3/1973 | McIlroy et al. | 23/262 |
| 3,815,332 | 6/1974 | Bobrowsky et al. | 261/DIG. 54 |
| 3,925,039 | 12/1975 | Ziegler | 261/DIG. 54 X |
| 3,976,455 | 8/1976 | Dahlem | 261/DIG. 54 |
| 3,998,926 | 12/1976 | Oliver et al. | 423/22 |
| 4,007,025 | 2/1977 | Hegemann | 266/147 X |
| 4,013,455 | 3/1977 | Kleeberg et al. | 23/262 X |

*Primary Examiner*—Joseph Scovronek
*Attorney, Agent, or Firm*—Cushman, Darby & Cushman

[57] ABSTRACT

This invention relates to apparatus for refining platinum group metal concentrates and the separation therefrom of silver and of the majority of base metals which are present with them. In more detail, the apparatus comprises means for reacting together gaseous hydrogen and chlorine so as to produce a flame and means for passing into the reaction zone of the said flame the said mineral concentrate in finely divided particulate form.

The apparatus comprises a tubular burner having a hydrogen-chlorine flame discharging into an inner heat resistant tube, means for the passage of the said mineral concentrates in particulate form through the reaction zone of the hydrogen chlorine flame, means for maintaining the reaction zone of the flame at a temperature within the range 900° C. to 2500° C. and means for scrubbing the reaction products after passage through the flame with an aqueous solution.

9 Claims, 6 Drawing Figures

TREATMENT OF MATERIAL WITH HYDROGEN CHLORIDE

This application is a continuation-in-part of U.S. Application Ser. No. 559,423 dated Mar. 18, 1975, now U.S. Pat. No. 3,998,926, issued Dec. 21, 1976.

This invention relates to improved apparatus which may be used for the refining of metal. In particular the invention is concerned with apparatus for the refining of platinum group metal concentrates and the separation therefrom of silver and of the majority of the base metals which are present with them.

In this specification, by "precious metal" we mean gold and any one or more of the platinum group metals (that is, Ru, Rh, Pd, Os, Ir and Pt) and by "base metal" we mean any one or more metals other than silver, gold and the platinum group metals.

Material requiring refining may be a mixture containing precious metal, base metal and/or silver components either in metallic form or combined in the form of chemical compounds. It is an object of the present invention to provide a simple and effective refining apparatus whereby a substantial proportion of the said silver and base metal components present in the said mixture are separated from the precious metal components and the concentration of the precious metal is thereby significantly increased.

In U.S. Application Ser. No. 559,424 dated Mar. 18, 1975, now U.S. Pat. No. 4,086,084, issued Apr. 25, 1978, there is described a process for the separation of components of base metal and silver from components of precious metal components in mineral concentrates which comprises the steps of:

(a) contacting a solid particulate mixture of base, silver and precious metal components any of which components may be in metallic or chemically combined form, with a halogen-containing gas at a temperature which is sufficiently high for the base metal and silver components to form their halides and from the said solid mixture and (b) removing the said volatilized halides from the solid precious metal-containing component which remains.

Preferably the separation process of our earlier application includes a further step:

(c) in which the solid precious metal-containing component remaining after step (b) is substantially dissolved in hydrochloric acid solution containing an oxidising agent.

Suitable oxidising agents which may be dissolved in the hydrochloric acid solution of step (c) are chlorine, bromine, hypochlorite, hypobromite, sodium chlorate and sodium bromate.

In Application Ser. No. 559,423 dated Mar. 18, 1975 which is a modification and improvement on the above-described process, a process for the separation of components of both base metal and silver from precious metal components in mineral concentrates comprises reacting together gaseous hydrogen and chlorine so as to produce a flame providing a reaction zone having a temperature within the range 900° C. to 2500° C., passing into the reaction zone of the said flame the said mineral concentrate in finely divided particulate form to obtain a reaction product wherein silver and base metal components in said concentrate are converted to their volatile chlorides while the precious metal components in said concentrate remain in solid water-insoluble form and separating the silver and base metal chlorides from the water-insoluble solids in the reaction product, said base metal being selected from the group consisting of Sb, Sn, Pb, Zn, Cu, Ni, Fe and As.

In the present invention, an apparatus is provided for carrying out the process of separation of both base metal and silver from precious metal components in mineral concentrates, said apparatus comprising a tubular burner having means for discharging a hydrogen-chlorine flame into an inner heat-resistant tube, means for the passage of said mineral concentrates in particulate form through the reaction-zone of said hydrogen-chlorine flame, means for maintaining said reaction zone at a temperature within 900° C. to 2500° C. and means for scrubbing the reaction products after passage through said flame with an aqueous solution.

Combustion of the hydrogen-chlorine mixture is carried out in a burner to which hydrogen gas and chlorine gas are fed at controlled rates and the finely divided material is carried to the burner in one or other or both of these gases. Alternatively or additionally, it may be fed to the burner in a stream of some diluent gas. The burner may be arranged in such a way either that hydrogen burns in chlorine or that chlorine burns in hydrogen.

One form of apparatus for carrying out the process of the present invention may comprise a concentric tube burner in which reacting constituents, having passed through the flame, discharge into a horizontal alumina, silica, titania, zirconia, hafnia, thoria or high alumina silica tube. Such a tube is kept at as high a temperature as possible to minimise heat loss and prolong the effective reaction time.

The combustion of the hydrogen and chlorine produces a very high temperature, typically at least 1000° C. and frequently much higher, to which, also, the finely divided mineral concentrate is exposed on passage through the flame. Preferably this temperature should be above 900° C. and may, for example, fall within the range 1500° C.–2500° C.

Temperatures lower than that normally found in an undiluted flame can be attained by introducing a preferably cold, and preferably inert, diluent gas into the mixture of gases and higher temperatures can be attained by pre-heating the hydrogen gas or chlorine gas or both before ignition.

Oxidising or reducing conditions at and near to the flame can be established by increasing or decreasing respectively the ratio of chlorine gas to hydrogen gas fed to the flame. These are suitably adjusted in response to the composition of the mineral concentrate. Passage of the powdered concentrate through the hydrogen chloride flame results in the formation of volatile chloride of most of the silver present and volatile water soluble chlorides of most of the base metal present. Preferably these may be removed from the gas stream in a wet scrubber.

The water soluble components of the product may be leached therefrom by immersing the product in water and the precious metal containing insoluble concentrate which remains, is separated from the resulting base metal chloride by physical methods, e.g. filtration.

A number of different embodiments of the invention will now be described with reference to the accompanying drawings labelled FIGS. 1, 1A, 2, 3, 3A and 4.

In FIG. 1, the tube assembly 1 comprising three concentric tubes 2, 3 and 4 having a common outlet 5 open into a much larger high alumina-silica tubular reaction vessel 6. Reaction vessel 6 has heat insulating lagging 7 preferably made of asbestos or asbestos-based material. If desired the reaction vessel 6 may be heated so as to prolong the effective reaction.

Concentric tube 2 has venturi restriction 2A allowing carrier gas entering tube 2 at entry port 9 to draw into the stream particulate feed material from entry port 10A. A suitable flow rate for carrier gas is 15 liters per minute for a particulate size range of feed material of −200 mesh (approximately). Hydrogen and chlorine are also both fed into entry ports 10B and 10C respectively at 15 liters per minute.

Figure 2:
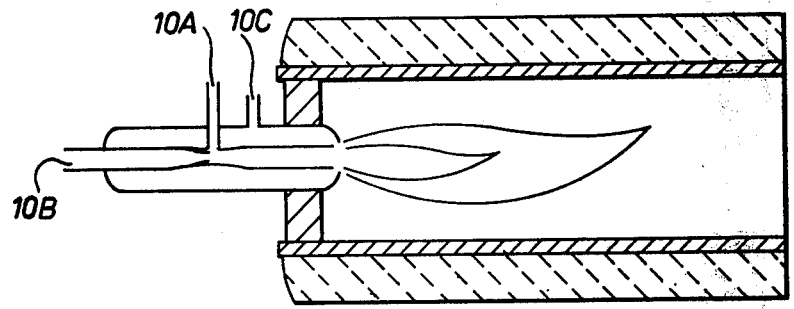

FIG. 2 depicts a modified version of the burner in which there is no separate carrier gas. Feed material in the hydrogen stream is admitted at entry port 10A and the use of a hydrogen stream prevents the induction of air into the reaction chamber. Hydrogen is also used as a carrier gas and for this purpose is admitted at entry port 10B. In a preferred mode of operation of the apparatus stoichiometric ratios of the two gases are used, as before but in the absence of a diluent carrier gas a much hotter flame is produced. Alternative stoichiometric ratios of hydrogen and chlorine are a possibility, however. Under some circumstances an excess of hydrogen or chlorine can produce better reaction conditions for operation of the invention. The solid feed system in FIG. 1A comprises a vibrofeeder 1 feeding particulate solid into funnel 2. The rate of operation of the vibrofeeder provides control over the throughput of particulate solid into the flame. The rate of flow of carrier gas, preferably hydrogen, provides control over the velocity of entry of particulate solid into the flame. These two factors may obviously be varied either separately or together to give optimum reaction conditions. A vibrational couple is provided between the vibrofeeder and the burner to ensure smooth flow of particulate solid. The vibrofeeder and the funnel are preferably enclosed and a hydrogen gas input to the enclosed feed system is provided in order to prevent induction of air with the solid feed.

Figures 3, 3A:
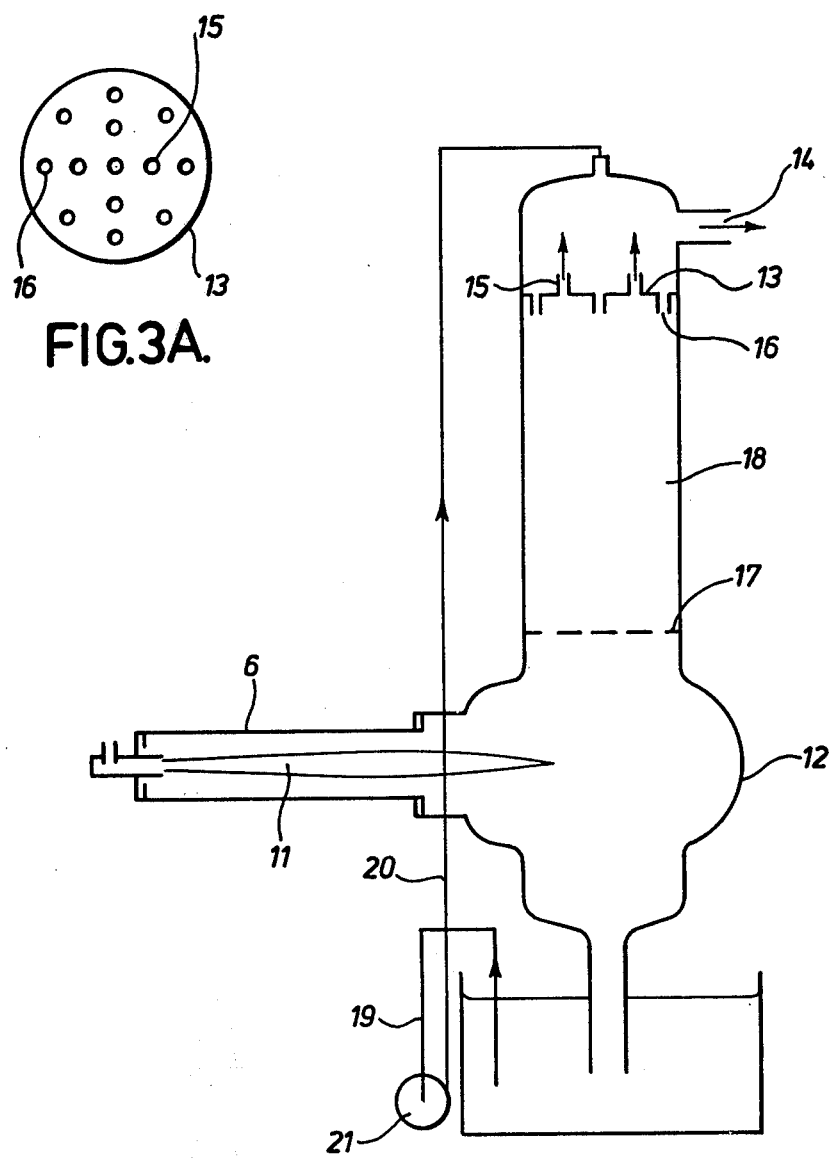

FIG. 3 shows the passage of the reacting solid in the flame 11 contained within the reaction chamber 6 into a low energy scrubber 12. High energy venturi scrubbers may be used in place of the low energy scrubber depicted in FIG. 3. An alternative high energy venturi scrubber is shown in diagrammatic form in FIG. 4.

Figure 4:
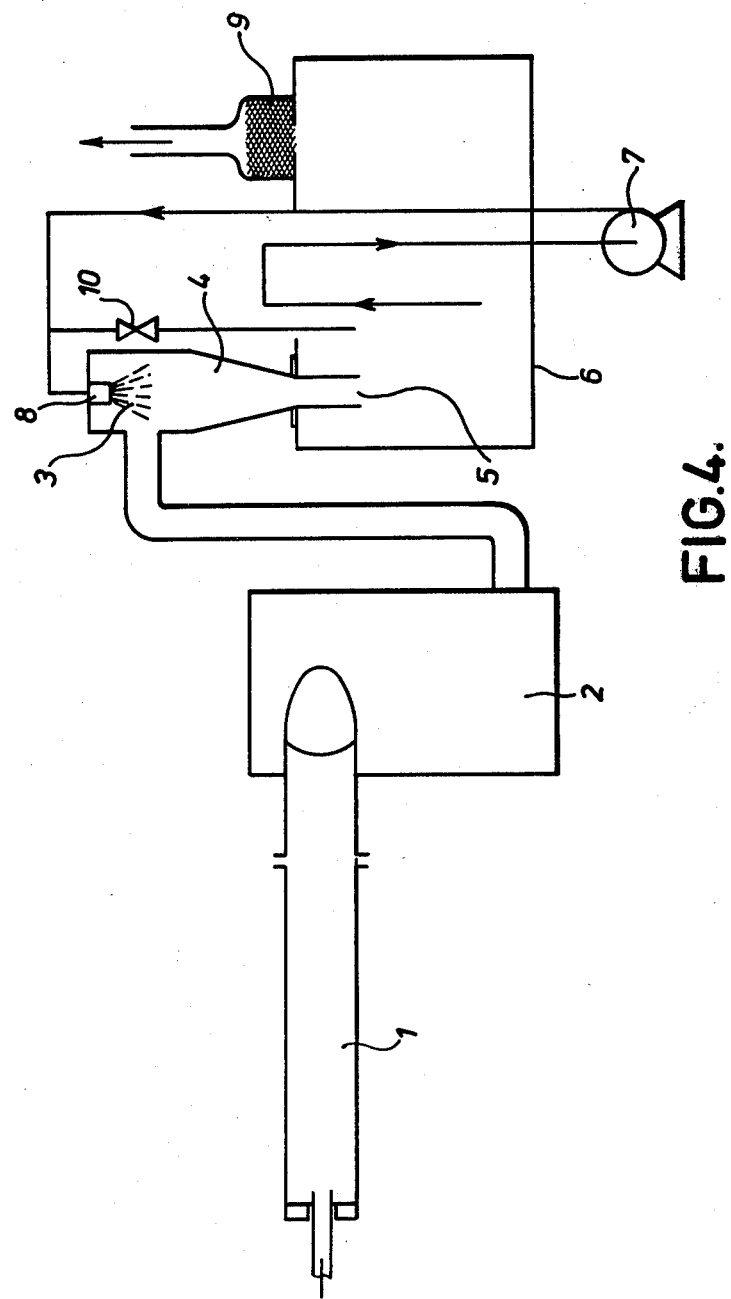

In FIG. 3 the low energy scrubber 12 has a distributor plate 13 near the top of the vessel having upwardly disposed jets 15 for the scrubbed exhaust gas to leave the vessel through exit port 14. It has downwardly disposed jets for the passage of scrubbing liquor. The plan of a typical distributor plate is shown in FIG. 3A. The space 18 between distributor plate 13 and retaining plate 17 is filled with 1 inch Raschig rings which provides for a large area of contact between scrubbing liquor and exhaust gases from the reaction chamber 6. Particulate solid collects in the form of a suspension in the scrubbing liquor and is periodically removed by filtration. Pipelines 19 and 20 provide for the recirculation of the scrubbing liquor by means of the pump 21. In FIG. 4 gases from the reaction chamber 1 pass into the expansion chamber 2 (which allows for variations of pressure) and then into a high velocity water stream 3. This passes through a turbulent zone 4 and out of nozzle 5 into tank 6. Scrub liquor is stored in tank 6 and is recirculated by pump 7 to re-enter the high energy scrubber by nozzle 8. A slurry of particulate solid in scrub liquor collects at the bottom of tank 6. Some solid collects in expansion chamber 2 and this is added to the slurry in chamber 6.

Scrubbed gases pass through demister 9 to a further exhaust scrubber (which is not shown). By-pass valve 10 controls the rate of flow of the scrub liquor.

Mode of Operation

Basically the same mode of operation is used whether a high-energy or a low-energy scrubber forms part of the apparatus. An oxygen-hydrogen flame is started in the reaction chamber and this is gradually converted to a chlorine-hydrogen flame. The molar ratio of hydrogen and chlorine present in the mixture is gradually altered eventually to produce a stoichoimetric ratio and in the absence of any diluent carrier gas produces a flame reaction zone at a temperature of approx. 2000° C. The rate of flow of carrier gas is adjusted so that a residence time in the hot zone of the flame of approx. 0.5 seconds is ensured.

Base metals chlorides are soluble in water and after passing through the scrubbing system are thus removed for filtration.

EXAMPLE

One way in which the apparatus of the present invention has been used for the treatment of a metal "concentrate" containing precious metal, base metal and/or silver in accordance with the method will now be disclosed.

Hydrogen was first caused to burn in chlorine by setting up an oxyhydrogen flame using a burner consisting of two concentric tubes and introducing chlorine in progressively increasing quantities into the stream of oxygen being fed to the burner. At the same time the amount of this oxygen was progressively reduced until a chlorine-hydrogen flame was obtained. Next, the rates of supply of chlorine and hydrogen were both regulated to 15 liters per minute. Finally, the metal concentrate starting material ground sufficiently finely for it to pass a 200 mesh sieve was fed to the chlorine-hydrogen flame in the hydrogen stream passing along a venturi tube at 15 liters per minute. The product, carried by the stream of hydrogen chloride gas, was then scrubbed in water (which became acidic) and the solids filtered off and analysed.

These solids are found to be significantly richer in precious metal than the starting material as shown in the table below:

|  | Starting Material wt. % | Product wt. % |
| --- | --- | --- |
| Pt | 28.3 | 38.0 |
| Pd | 16.0 | 21.5 |
| Ir | 1.1 | 1.5 |
| Ru | 10.0 | 13.4 |
| Rh | 3.8 | 5.1 |
| Os | 0.3 | 0.4 |
| Au | 1.7 | 2.3 |
| Ag | 1.3 | 0.1 |
| Cu | 6.3 | 0.8 |
| Ni | 2.7 | 0.3 |
| Fe | 3.9 | 0.4 |
| Te | 2.1 | 0.3 |
| Se | 0.3 | less than 0.1 |
| Sb | 3.1 | 1.0 |
| Pb | 3.3 | 0.2 |
| S | 1.4 | less than 0.1 |
| Balance | 14.4 | 14.7 |

The balance of the composition of starting material consists mainly of non-metals with which some or all of the metallic components of the starting material are combined, together with one or more refractory oxides such as silica, alumina, titania and stannic oxide. The same applies to the "balance" of the composition of the product, except that here the proportion of refractory oxides which survives exposure to the hydrogen chloride is increased.

When the particulate solid is exposed to the flame of hydrogen and chlorine at elevated temperature practically all of the silver and all of the base metals such as Sb, Sn, Pb, Zn, Cu, Ni, Fe and As (but not all of the Se and Te) are converted to chloride. However, at the temperature of operation of the process of the present invention the precious metal chlorides are not formed as stable compounds.

An advantage of the present invention is that treatment of the raw material concentrate with reacting $H_2$ and $Cl_2$ at elevated temperature renders the precious metal containing residue soluble in oxidising hydrochloric solution.

What we claim is:

1. Apparatus for separating base metal and silver from precious metal components in a mineral concentrate containing the same which comprises:
   (a) a tubular member made of heat resistant material and forming a reaction zone,
   (b) a tubular assembly including at least one tube having an end opening into said reaction zone and means for passing hydrogen and chlorine through said assembly to said end to form a hydrogen-chlorine flame at said end extending into said reaction zone,
   (c) a supply of mineral concentrate in particulate form and means communicating with said supply and including a venturi intermediate the ends of said tube for inducting said concentrate in particulate form into said tube and for feeding the thus inducted concentrate through said tube to the end thereof and then into said flame,
   (d) heat insulation means for maintaining said reaction zone at a temperature between 900° C. and 2500° C.,
   (e) means for removing the resulting reaction mixture from said reaction zone, and
   (f) means including a high turbulence zone for scrubbing the thus removed reaction mixture by contact with a high velocity concurrent aqueous scrubbing solution.

2. Apparatus according to claim 1 in which the heat resistant material comprises ceramic.

3. Apparatus according to claim 2 in which the ceramic is selected from the group consisting of alumina, silica, alumina-silica, titania, zirconia, hafnia and thoria.

4. Apparatus according to claim 2 in which the ceramic is lagged.

5. Apparatus according to claim 1 wherein said assembly includes separate concentric tubes for supplying hydrogen and chlorine.

6. Apparatus according to claim 5 including means for supplying a carrier gas to feed said concentrate through said tube.

7. Apparatus according to claim 6 in which the particulate mineral concentrate is fed to the carrier gas by means of a Vibrofeeder.

8. Apparatus according to claim 6 in which means are provided for controlling the rate of flow of hydrogen, chlorine and carrier gas to the said flame.

9. Apparatus according to claim 1 including an expansion zone between the reaction zone and the scrubbing means.

* * * * *